J. A. STEINMETZ.
PROTECTING VESSELS IN WAR.
APPLICATION FILED NOV. 14, 1917.

1,325,542. Patented Dec. 23, 1919.

Inventor
Joseph A. Steinmetz

Witness
Edwin L. Bradford

By
Attorneys

UNITED STATES PATENT OFFICE.

JOSEPH A. STEINMETZ, OF PHILADELPHIA, PENNSYLVANIA.

PROTECTING VESSELS IN WAR.

1,325,542.  Specification of Letters Patent.  Patented Dec. 23, 1919.

Application filed November 14, 1917. Serial No. 201,949.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Protecting Vessels in War, of which the following is a specification, reference being had therein to the accompanying drawing.

This invention relates to screening vessels from observation and to lessening the destructive effect of torpedoes upon watercraft so that in many cases vessels that would otherwise be destroyed may be saved. It is common knowledge that under suddenly exerted force tending to displace it, water acts like a solid of equal density. It follows that when a torpedo is exploded in contact with a vessel's wall, the water serves as an approximately unyielding abutment against which the force reacts in destroying the less unyielding vessel. The lessening of the destructive effect follows any lessening of the water's resistance, and decreasing this resistance is an object of this invention. Such decrease is obtained by rendering the water adjacent to the vessel cellular by any suitable means, as by rapidly injecting large quantities of aeriform fluid to form innumerable bubble-like cavities therein, whereby this stratum may be readily compressed sponge-like.

In the accompanying drawings.

Figure 1:
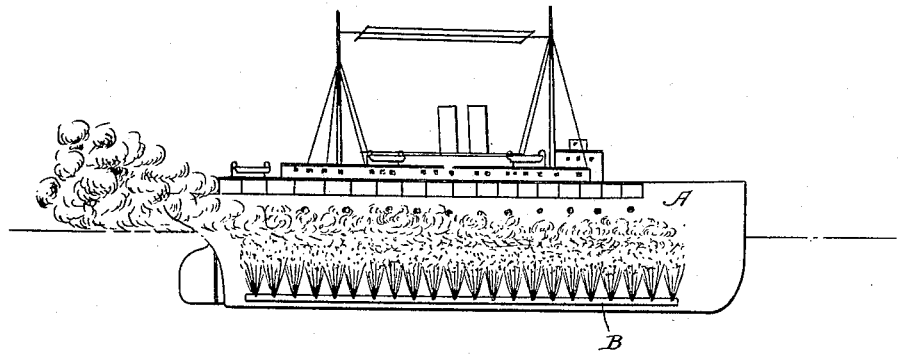
Figure 1 is a side view of a vessel provided with my devices.
Figure 2:
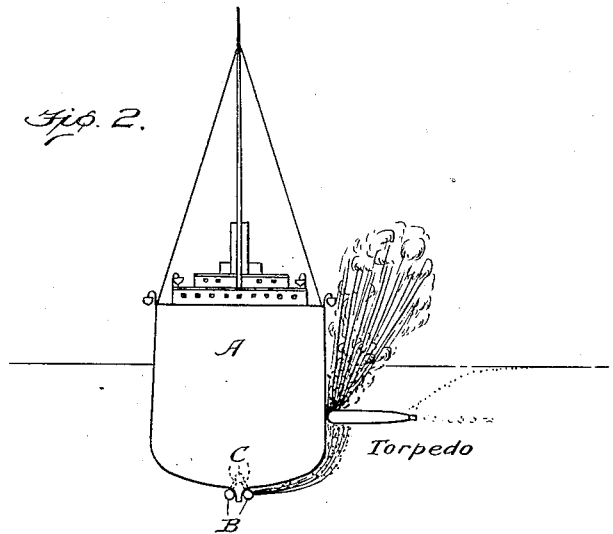
Fig. 2 is an end view of the same structure.
Figure 3:
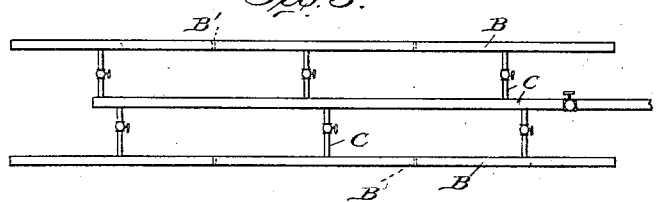
Fig. 3 is a diagram showing an advantageous arrangement of conduits.

In these views, A represents any vessel to be protected, and B conduits for discharging the aeriform fluid into the water alongside the ship. The conduits B may be supplied with fluid under pressure by pipes C from any suitable compressor, tank, boiler, or other source for steam, air, smoke, etc.

The fluid conduits B preferably discharge outwardly, through suitable openings, approximately in a horizontal direction, and at any given time the discharge may, at will, be wholly in any fore and aft region on one or the other side of the vessel, this capacity being the result of any suitable arrangement of conduits. As shown, each conduit B is a laterally perforated pipe divided into compartments by transverse partitions B' and each compartment is supplied with fluid under pressure by a valved branch from the pipe C. It often happens that the line of motion of an approaching torpedo is known for a brief interval before it can strike the vessel, and in that case the proper valve or valves may be opened to discharge only at or near the point where such line meets the ship. Rapidly injecting gaseous fluid into the water creates innumerable cells in the body of water so that water is driven from a large fraction of the space alongside the ship. If steam be thus discharged, very rapidly, countless temporary voids are created. If air, or smoke, or other permanent gas be used, the cells formed are filled with the highly elastic medium employed. If a torpedo explodes by contact with the wall of the vessel, the cells allow the water to yield very readily and suddenly and a large part of the force is expended in pushing aside the yielding cellular mass of water, which moves more readily than the ship's wall. It follows that the destructive effect of the explosion is greatly lessened.

When desired, the discharged gaseous fluid may be such that on rising to the water's surface it forms an opaque cloud, which thus may serve as a valuable screen defense before or after torpedoes have been directed against the vessel. Such gases include steam, partially burned, heavy hydrocarbon oils, and others commonly used for similar purposes.

It is also quite possible to use gas of such color as to make the ships hardly distinguishable at a moderate distance from the sea itself and to regulate the discharge accordingly, since only a relatively slow discharge is needed for camouflage.

What I claim is:

1. The method of lessening the destructive action of torpedoes which consists in forming in the water alongside a ship a series of continually replaced cells at different distances from the hull of the ship.

2. The method of lessening the destructive action of torpedoes exploding alongside water craft which consists in forcibly injecting aeriform fluid into the water, alongside the vessel to be protected, through apertures adapted to cause the formation in the water of innumerable independent cells at varying distances from the hull.

3. The method of lessening the effect of torpedoes upon structures attacked thereby which consists in converting an adjacent layer of water into a cellular readily yielding mass by forcibly spraying into said layer a large volume of aeriform fluid through apertures adapted to secure the formation in the water of innumerable cells as distinguished from a sheath of the fluid.

4. The mthod of lessening the danger of destruction by torpedoes which consists in discharging into the water alongside and near the keel of a vessel to be protected a large volume of aeriform fluid to form above the surface of the water a gaseous cloud adapted to lessen the visibility of the vessel.

5. The combination with a ship, of means upon the ship for forming the water adjacent to any selected region of its hull into a protecting cellular mass by injecting into the same aeriform fluid creating in the water innumerable cells occupying a large fraction of the space alongside that portion of the vessel.

In testimony whereof I hereunto affix my signature.

JOSEPH A. STEINMETZ.